United States Patent [19]

Doi et al.

[11] Patent Number: 5,564,555
[45] Date of Patent: Oct. 15, 1996

[54] SCREW CONVEYOR FOR TRANSPORTING POWDER WITH AUTOMATIC AIR WASHING DEVICE

[75] Inventors: Yoshihito Doi; Shinsaku Kamimura, both of Handa, Japan

[73] Assignee: Tsukasa Industry Co., Ltd., Aichi, Japan

[21] Appl. No.: 501,156

[22] Filed: Jul. 11, 1995

[51] Int. Cl.⁶ ..................................................... B65G 45/00
[52] U.S. Cl. ................................ 198/495; 198/670
[58] Field of Search .................................. 198/494, 495, 198/657, 670

[56] References Cited

U.S. PATENT DOCUMENTS 940,075  11/1909  Schuster .................................. 198/495

FOREIGN PATENT DOCUMENTS 0075719  4/1986  Japan ..................................... 198/495
0123014  5/1990  Japan ..................................... 198/495
405147721A  6/1993  Japan ................................. 198/495
1657454A1  6/1991  U.S.S.R. ............................... 198/495

*Primary Examiner*—D. Glenn Dayoan
*Attorney, Agent, or Firm*—Morrison Law Firm

[57] ABSTRACT

A hollow shaft of a screw conveyor for transporting powder material receives pressurized air in its interior. A plurality of openings through the wall of the hollow shall permits the pressurized air to exit energetically to prevent build-up of the powder material on the inside wall of the casing of the screw conveyor. In one embodiment, the openings are slits angled with respect to the axis of the screw conveyor at about the same angle as the helical blade. This produces a swirling flow of air which, in addition to preventing build-up of materials, enhances the advance of the powder material and, when the powder material is a mixture of different materials, helps prevent separation of the materials during transport.

6 Claims, 3 Drawing Sheets

SCREW CONVEYOR FOR TRANSPORTING POWDER WITH AUTOMATIC AIR WASHING DEVICE

BACKGROUND OF THE INVENTION

The present invention relates to a screw conveyor for transporting powdered materials such as, for example, powdered foods, powdered chemicals, powdered pharmaceuticals, and the like.

Materials in powder form include granulated sugar, glucose, powdered skim milk, starch, rice bran, seasonings, cement, fly ash, carbon black, salt, detergent, wheat, rice, maize, soybean, malt, quartz sand, aluminum oxide, titanium oxide, calcium carbonate, dust coal, lime, soda ash, powder food mixes, flour, powder soup, powder petrochemicals, pharmaceuticals, pigments, mixed fertilizer, phenol resins, polyethylene resins, ABC resins, PVC powder, polypropylene powder, powder coating, and the like. These are supplied as powder raw material to the manufacturing company. After being processed in the manufacturing company, these powder materials are generally packed in bags or plastic containers and supplied to the market.

In small- and medium-scale factories, the powder material, typically shipped by trucks or freight cars, is used straight from the plastic containers and bags. In large-scale factories, the usage amount is much greater, and the shipping and handling of the material involves heavy labor. In order to improve the work environment technology for automated conveyance of powder is in practice.

The technology for automated transport of powder material involves first bringing in the material into a storage tank from a truck or rail car by air conveyance. Air conveyance uses a blower for air conveying the material to a holding tank. A screw conveyor runs through each production line for sending the powder material to temporary storage tanks of a processing apparatus. But for the technique described above, the screw conveyor transports material by rotating a helical blade of the screw conveyor inside a tube casing.

In a conventional screw conveyor, a gap between the edge of the rotating blade and the interior wall of the casing permits some of the powder material to adhere, and thus to and remain in this gap as the material is being transported. This is a special problem if the powder material is food matter, or a spoilable material, since long retention of a residue in the screw conveyor may permit the material to spoil or to permit insect infestation. Spoiled or insect-infested material in the screw conveyor may become dislodged, thereby permitting this undesirable material mix with a powder currently being transported. Not only does this degrade quality, but it also produces unsanitary conditions.

An additional problem arises from the powder accumulating in one direction on the inside wall of the casing. This can displace the screw toward the opposite wall to reduce the clearance between the blade edge and the casing sufficiently, in a worst case scenario, to force the edge of the screw conveyor blade into the casing wall on the opposite side from the buildup. This can cause wear, damage and stoppage of operation.

Upon the occurrence of such problems, the usual practice is to slop the conveyor and to wash the conveyor with water. But, in order to wash with water, everything attached to the screw conveyor must be removed. This is costly in terms of labor and downtime, and is thus a major inconvenience. After washing the casing, its entire interior must be dried completely before it can be returned to operation. Only then may the processing machinery be restarted. As a result, productivity is lower, and the financial losses that result can be a critical problem for the whole plant.

OBJECTS AND SUMMARY OF THE INVENTION

The object of the present invention is to provide a screw conveyor which overcomes the drawbacks of the prior art.

It is a further object of the invention to provide a screw conveyor for transporting powders including an automatic air washing device which does not require manual labor or the disassembly of the apparatus to provide continuous operation.

It is a further object of the invention to provide a screw conveyor which includes an automatic air wash for preventing the buildup of residual powder from interior surfaces of the casing.

Briefly stated, there is provided a screw conveyor for transporting powder material having a hollow shaft that receives pressurized air in its interior. A plurality of openings through the wall of the hollow shall permits the pressurized air to exit energetically to prevent build-up of the powder material on the inside wall of the casing of the screw conveyor. In one embodiment, the openings are slits angled with respect to the axis of the screw conveyor at about the same angle as the helical blade. This produces a swirling flow of air which, in addition to preventing build-up of materials, enhances the advance of the powder material and, when the powder material is a mixture of different materials, helps prevent separation of the materials during transport.

According to an embodiment of the invention, there is provided a screw conveyor for transport of powder materials comprising: a cylindrical casing, a helical screw in the casing, means for rotating the screw in a direction to advance a powder material from an input position to an output position along the casing, means for permitting feeding of the powder material into the input position, means for permitting the powder material to exit the casing at the output position, the helical screw, including a shaft along an axis thereof, an axial opening in the shaft, means for feeding a pressurized air into the axial opening, and a plurality of openings passing though a wall of the shaft between the axial opening and an interior of the casing, whereby the pressurized air exits the plurality of openings energetically to prevent deposit of the powder material on an interior wall of the casing.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
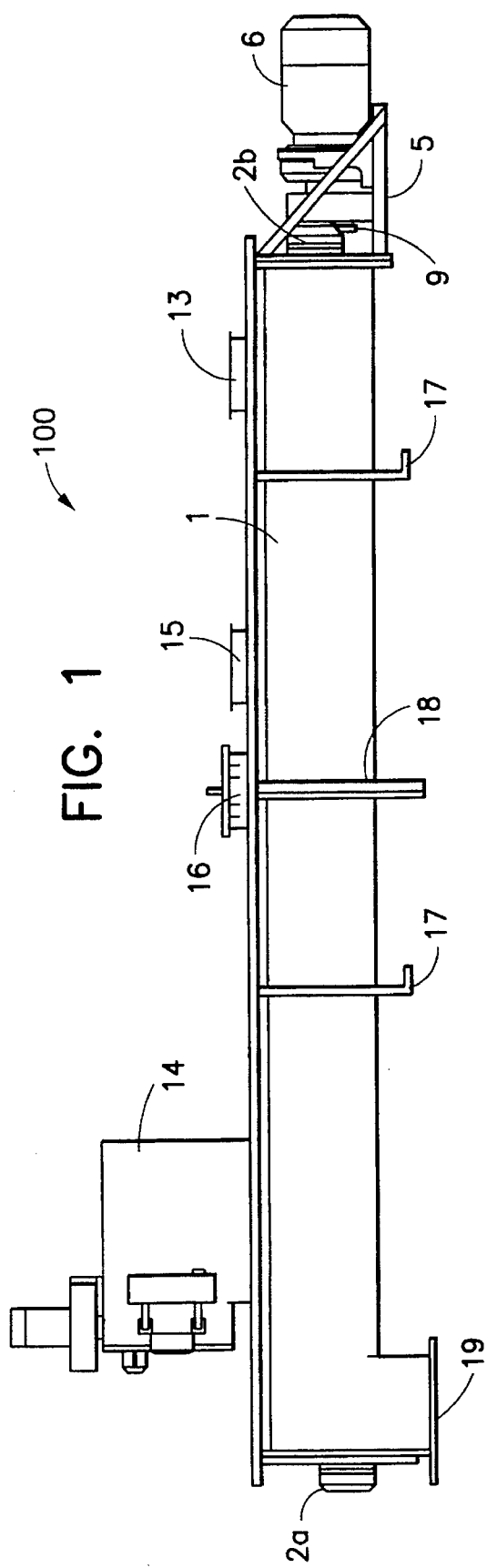
FIG. 1 is an exterior side view showing an overall view of a screw conveyor with automatic air wash according to an embodiment of the present invention.
Figure 2:
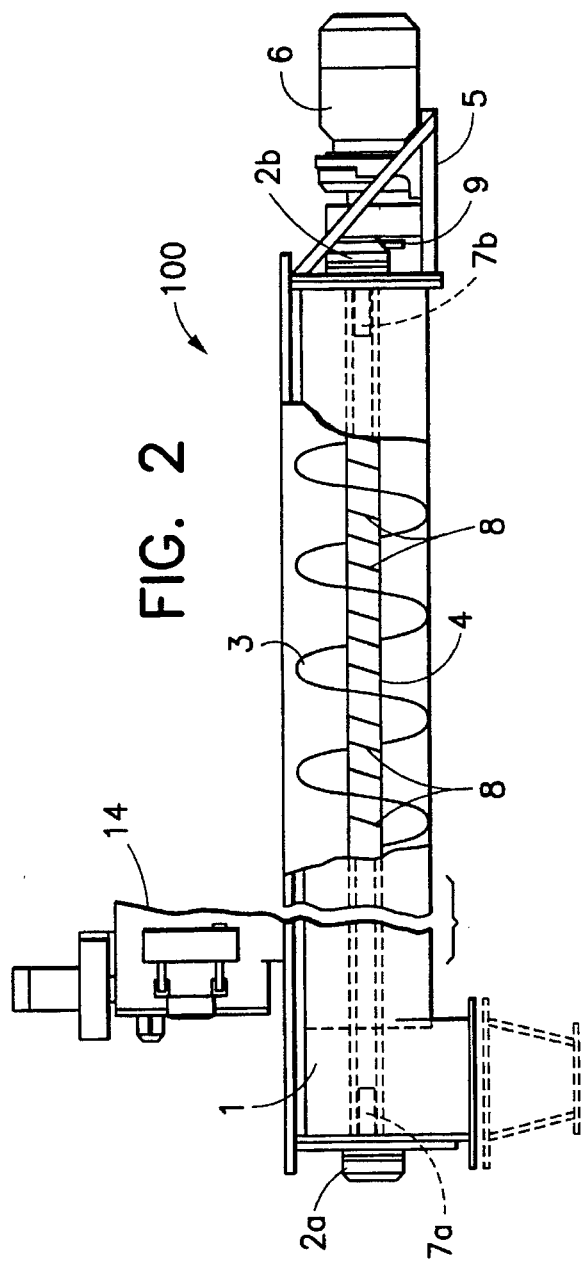
FIG. 2 is a side view corresponding to FIG. 1, in partial cross section showing internal details of the screw conveyor.

Referring to FIGS. 1 and 2, a long cylindrical casing 1 includes bearings 2a and 2b at its ends. A rotating shaft 4 is mounted rotatably inside of casing 1 on bearings 2a and 2b. A left-handed blade 3, forming a continuous outward spiral, is affixed for rotation by rotating shaft 4.

A geared motor 6, mounted on a frame 5 outside bearing rotates rotating shaft 4 and left-handed blade 3 in a direction to advance the spirals of blade 3 from right to left of FIGS. 1 and 2. This rotation advances powdery material from right to left.

Figure 3:
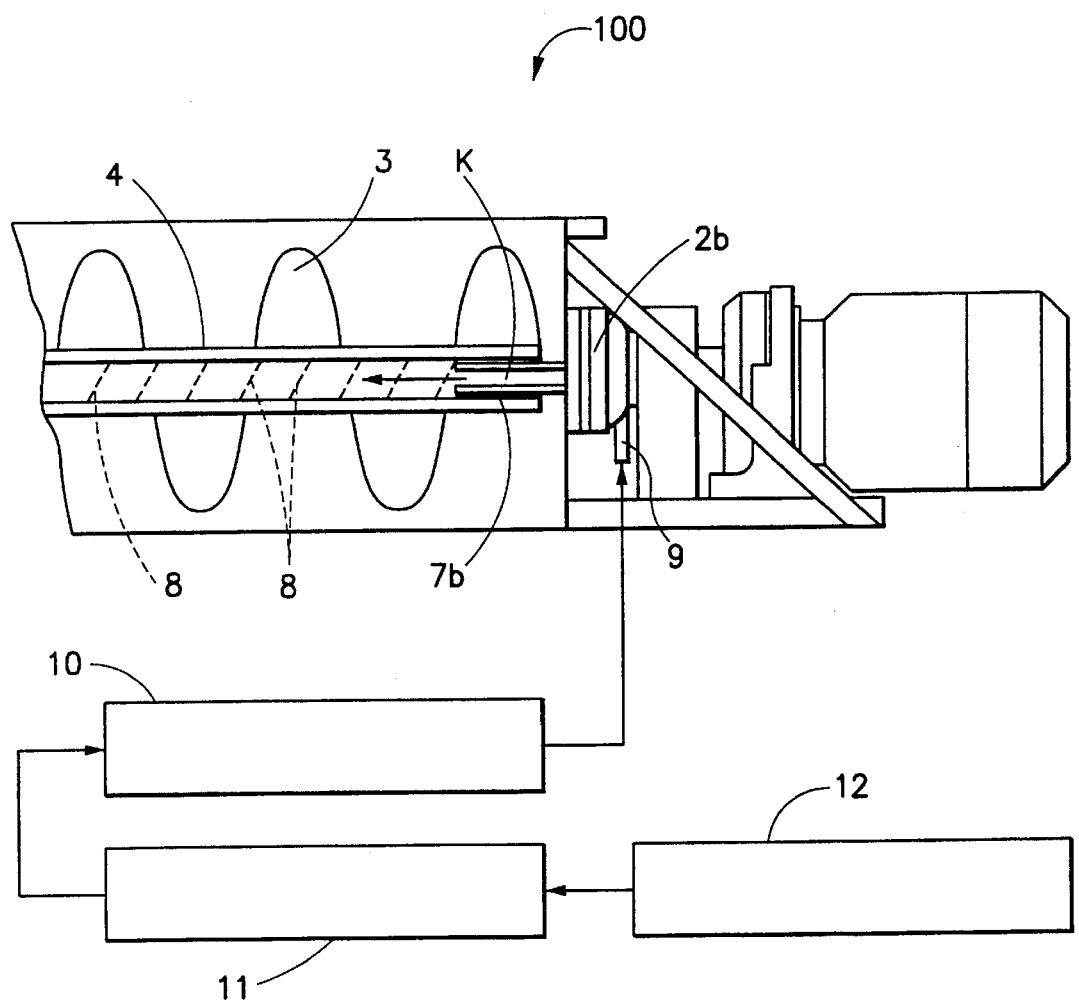
FIG. 3 is an enlarged drawing to which reference will be made in describing the interior of the screw conveyor.

Referring now also to FIG. 3 rotating shaft 4 is a hollow pipe with stub shafts 7a and 7b inserted into its ends. Shafts 7a and 7b are rotatably supported by bearings 2a and 2b at the ends of casing 1.

A plurality of angled slits 8 are formed in surface of rotating shaft 4. Each slit 8 is preferably from about 0.2 to about 0.4 mm wide. Slits 8 are formed generally parallel to the angle of the blades of left-handed blade 3. Slits 8 are positioned in shaft 4 at positions between the locations where blade 3 is affixed to shaft 4. Slits 8 pass completely through the wall into the hollow interior of shall 4.

Figure 4:
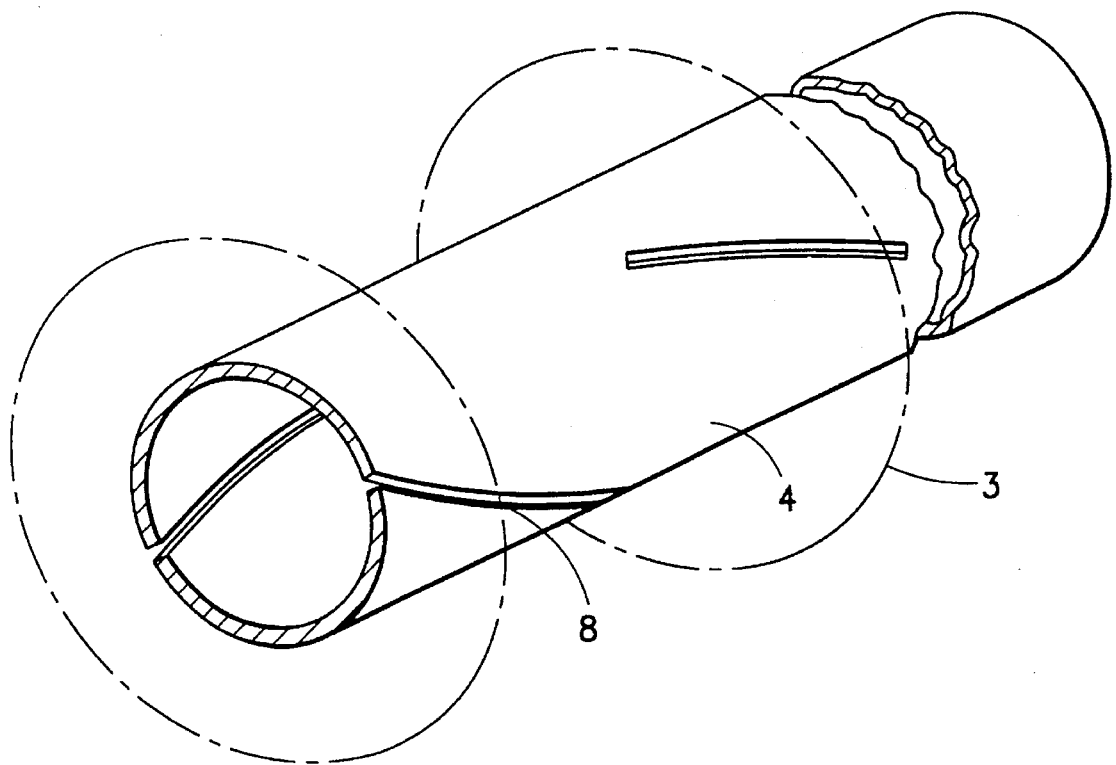
FIG. 4 is an enlarged oblique view of the shall of the screw conveyor with a cross section taken in the center, and with the screw shown in dashed lines to reveal the surface of the shaft and the slits therein.
Figure 5:
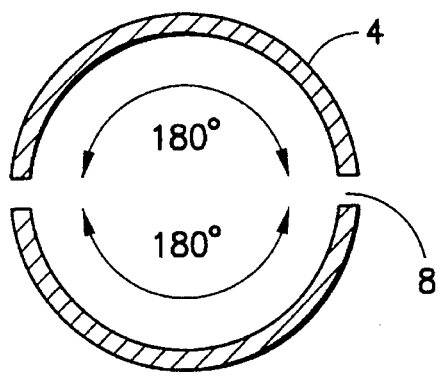
FIG. 5 is an end view of FIG. 4 showing the relative positions of the pair of opposed slits about the shaft.

Referring momentarily to FIGS. 4 and 5, slits 8 are formed as opposing pairs on the outer surface of rotating shaft 4. Each slit 8 occupies about 180 degrees of the circumference of rotating shaft 4. As rotating shall 4 performs one revolution of 360 degrees, a point on the inside of casing 1 is first exposed to a blast of air from one of slits 8, and then, after a rotation of rotating shall 4 of 180 degrees, the same point is exposed to a blast of air from slit 8 positioned 180 degrees from the first slit 8.

In some applications, it may be preferable to employ a single slit spiralling through 360 degrees of the surface of rotating shaft 4. The 360-degree slit may be less than totally desirable because of the weakness that it may impart to rotating shaft 4. In other applications, three or more slits 8 may form a set about the circumference of rotating shaft 4. The two-slit embodiments of FIGS. 2 and 4 show that the angle of slits 8 with respect to the axis of rotating shaft 4 may be different for different applications. In addition, as shown in FIG. 4, each slit 8 may cover less than 180 degrees of the circumference of rotating shaft 4. It is contemplated that some applications may permit elimination of the inclination of slits 8, so that slits 8 may be formed parallel to an axis of rotating shaft 4. This latter embodiment has the advantage that it is easier to form slits parallel to the axis of rotating shaft 4 than at an angle thereto. Some applications may permit the use of single slits 8 spaced along rotating shall 4 rather than the sets of slits 8 illustrated and described above.

One skilled in the art will recognize that other shaped openings besides slits will perform the function of the present invention. For example, it would be clear that a plurality of rotund holes through shaft, forming a pattern substantially the same as angled slits 8 would accomplish the same result as is achieved by slits 8. Also, instead of a single slit 8 in each position, several shorter slits end to end may be employed, generally covering substantially the same area as a single slit 8 of the described embodiment.

Shaft 7b, at one end of rotating shaft 4, has an opening K through its center communicating with the hollow portion of rotating shaft 4. The other end of opening K in shaft 7b is connected to a rotary single-action coupling tube 9 on bearing 2a.

A compressor 12 feeds a supply of pressurized air to an air pressure tank 10. Pressurized air is fed from air pressure tank 10 to coupling tube 9 though a solenoid-operated diaphragm 10. This pressurized air is fed through slits 8 which, as noted above, rotate with rotating shaft 4. Thus, the interior of casing 1 is continuously cleared of powdery debris by the rotating blasts of pressurized air impinging thereon.

Referring again to FIG. 1, powder material is fed through a powder feed hole 13 into the interior of casing 1. The powder material is transported the: length of casing 1 to an outlet through which the powder material is discharged.

A filter 14 filters the air passing from the interior of casing 1. A suction duct 15 applies negative pressure to the interior of casing 1 to reduce the amount of air exiting through filter 14 and outlet 19. An inspection hatch 16 permits inspection of the interior of casing 1, and of rotating shaft 4 and blade 3 contained therein. An installation attachment deck 17 provides horizontal legs through which bolts, or other fasteners, may be inserted for installing screw conveyor 100 in its operating position.

An optional joint 18 in casing 1 reduces the overall length of a shipping container required for shipping screw conveyor A control panel (not shown) supplies a drive voltages to geared motor 6 and to compressor 12. While screw conveyor 100 is operating, solenoid-operated diaphragm 10 is opened to release high-pressure air from air pressure tank 11 into rotary coupling tube 9. The air then passes through and shaft 7b into the hollow interior of rotating shaft 4. The air then blows at high velocity through slits 8 into the interior of casing 1. Since rotating shaft 4 is rotating, and since slits 8 are angled with respect to an axis of rotating shaft 4, the high-pressure air from slits 8 produce a spiraling, high-pressure flow which advances with spiraling left-handed blade 3, forming a whirlwind. This whirlwind flows from geared motor 6 towards filter 14 of casing 1.

By this mechanism, the following objects are obtained:

1. The screw conveyor transports powder material without leaving a residue on the wall of casing 1.

2. Since the sides and upper walls of the interior of casing 1 (areas, which are most likely to have powder residues) are air washed as the material is transported, the interior of casing 1 as well as spiraling left-handed blade 3 does not build up a residue. Thus a clean condition is maintained.

3. Since the powder material is moved in a spiralling wind of high-pressure air, directed in the downstream direction of transport, the transport of material is accelerated.

4. If the powder material involves several powders mixed together, the additional agitation imparted by the spiralling air flow helps prevent separation of the powder mixture and increases the degree of mixing.

The improvements listed above are attained without relying on manual maintenance to clean out material accumulated on the walls of casing 1. Thus, continuous operation is enabled. The screw conveyor of the present invention solves a major problem with previous screw conveyors, namely the adherence of powders to the interior of the machinery and the possible contamination of powders if spoilage occurs in residues. The device not only dramatically benefits the financial and sanitary situation, but it also helps the working environment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the same mechanism and results will be attained even if spiraling left-handed blade 3 is removed from rotating shaft 4.

What is claimed is:

1. A screw conveyor for transport of powder materials comprising:

a cylindrical casing;

a helical screw in said casing;

means for rotating said screw in a direction to advance a powder material from an input position to an output position along said casing;

means for permitting feeding of said powder material into said input position;

means for permitting said powder material to exit said casing at said output position;

said helical screw including a shaft along an axis thereof;

an axial opening in said shaft;

means for feeding a pressurized air into said axial opening; and a plurality of openings passing though a wall of said shaft between said axial opening and an interior of said casing, whereby said pressurized air exits said plurality of openings energetically to prevent deposit of said powder material on an interior wall of said casing.

2. A screw conveyor according to claim 1, wherein said plurality of openings includes means for forming a swirling helical air flow in said casing.

3. A screw conveyor according to claim 2, wherein:

said means for forming includes said plurality of openings being a plurality of slits; and said plurality of slits being angled at substantially the same angle to an axis of said screw conveyor as said helical screw.

4. A screw conveyor according to claim 3, wherein said plurality of slits have widths of from about 0.2 to about 0.4 mm.

5. A screw conveyor according to claim 1, further comprising a suction duct in said casing, said suction duct permitting the application of a negative air pressure to an interior of said casing.

6. A screw conveyor according to claim 1, further comprising a filter at said output position, said filter permitting exit of said pressurized air from an interior of said casing, without permitting escape of said powder material.

\* \* \* \* \*